March 2, 1948.                R. C. ZEIDLER                2,436,911
FLUID COUPLING
Filed April 26, 1945
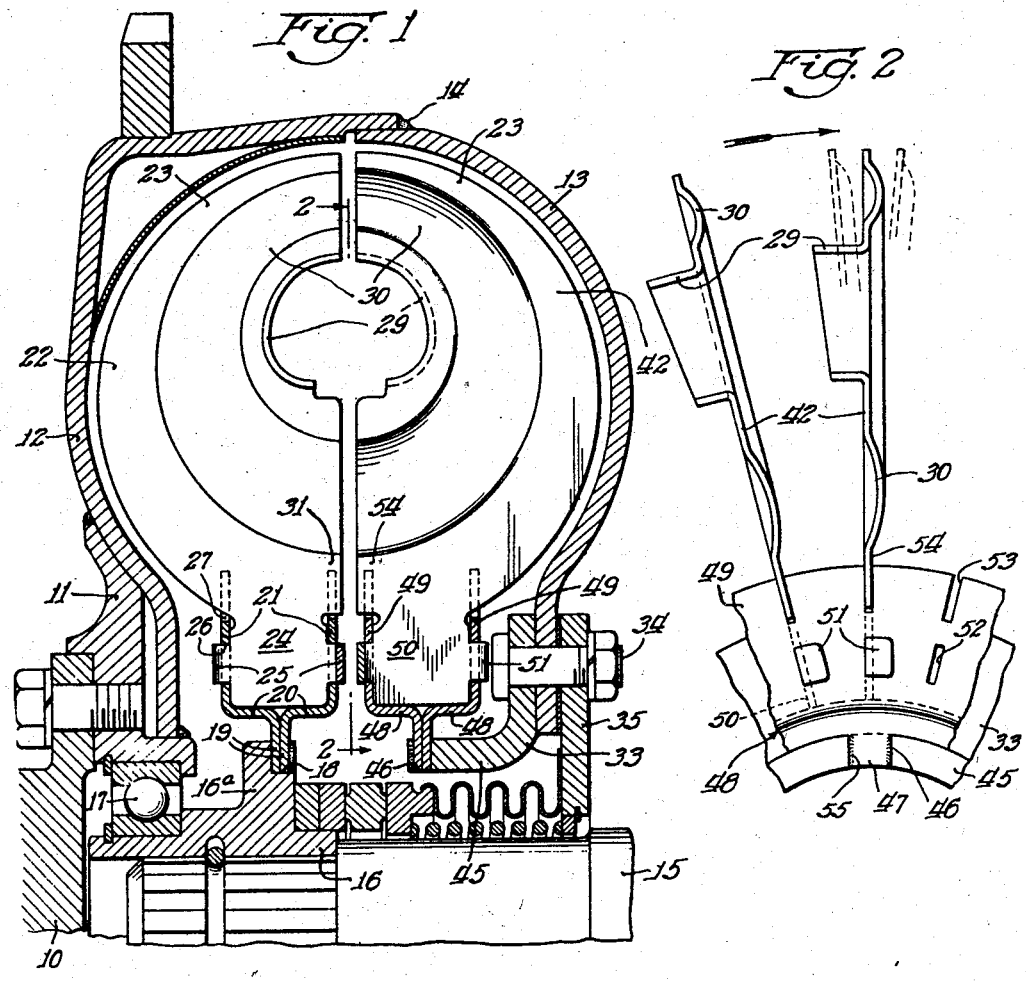
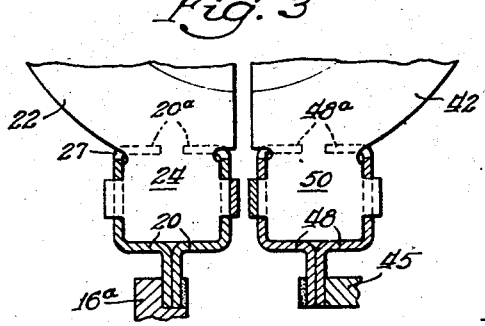
Inventor:
Reinhold C. Zeidler Patented Mar. 2, 1948

2,436,911

UNITED STATES PATENT OFFICE 2,436,911

FLUID COUPLING

Reinhold C. Zeidler, Detroit, Mich., assignor to Borg-Warner Corporation, Chicago, Ill., a corporation of Illinois Application April 26, 1945, Serial No. 590,348

13 Claims. (Cl. 103—115)

This invention relates to hydraulic couplings of the vaned type and it has specific reference to mounting means for the coupling vanes, provision being made for flexing these vanes.

The present application is a continuation in part of the application of R. C. Zeidler, filed April 5, 1941, Serial No. 387,019, for "Fluid coupling," now Patent No. 2,378,353, issued June 12, 1945.

The principal object of this invention is to provide an improved fluid coupling which is lighter and less expensive to make, and which inherently effects a mechanical shock absorbing function to eliminate vibration and shocks during low slip conditions.

A specific object of this invention is to provide a fluid coupling wherein the vanes are free of the housing defining the hydraulic circuit so as to be able to move relatively thereto in such regions.

Another object of this invention is to provide a coupling having flexible vanes with means on each vane defining a core ring.

Another object of this invention is to provide a simplified mounting means for each vane so as to make unnecessary the use of elaborate and expensive special welding equipment.

Still another object of this invention is to provide a flexible vane element having a concave stiffening rib formed therein conforming to the working circuit of the fluid coupling, the said vanes being drivingly connected to hub members on which the vanes are mounted by slotted spaced washer members.

These and other objects and features of this invention will become apparent from the following description when taken together with the accompanying drawings in which:

Fig. 1 is a fragmentary side elevation, partly in section, of a fluid coupling showing the instrumentalities of this invention;

Fig. 2 is a fragmentary front elevation wherein the flexibility of the vanes is shown; and Fig. 3 shows a modified vane mounting arrangement.

The assembly herein described is particularly adapted for installation in a motor vehicle, but it will be understood that it is capable of use in other arrangements where driving and driven members are coupled.

Referring now to a detailed description of the invention, 10 is a drive shaft to which is bolted a casting 11 which is welded to a stamped housing 12. A second stamping 13 having the form shown in Fig. 1 is welded to stamping 12 at 14 to form a fluid-tight housing for the fluid coupling. Said housing defines a substantially toroidal container.

A driven shaft 15 extends into the housing formed by stampings 12, 13 and supports a hub 16 at the forward or inner end thereof, said hub being splined to the shaft so as to form a driving connection with the latter. Hub 16 is in turn supported from casting 11 by means of a bearing 17.

The hub 16 has an annular flange 16a provided with radial slots 18 at the inner face thereof which receive ears or splines 19 at the radially inner margins of duplicate disc or ring-like stampings 20 each of which has an offset outer annular margin 21. As seen, the disc or ring-like stampings 20 are oppositely positioned to space the offset margins 21 laterally to each other, thus providing a structure of Y-shape cross-section to provide suitable means for mounting the vanes 22.

The vanes 22 comprise flexible metal stampings having the shape shown in Fig. 1. It will be observed that the outer portion 23 of each vane is of a substantially semi-circular shape, and that the radially inner portion 24 is of substantially rectangular shape. The inner portion is partially received between the offset margins 21 of the mounting discs or rings 20 so as to leave a section of the vane between the hub flange 18 and the semi-circular vane portion 23 which is outside the working circuit of the coupling. Preferably no other support is provided for the vane, and particularly no semi-toroidal shell is attached to the vanes as is customary in previous designs. For this reason the entire portion of the vane in the hydraulic circuit is free. In view of the relatively smaller width of the inner portion 24, the principal flexing of the vane will occur at this location.

As seen in the drawings, the means for attaching or anchoring the vane 22 on the mounting assembly comprise lateral tabs 25 on the opposite radially extending edges of the rectangular section 24 of the vane 22, which tabs 25 fit into radial slots 26 in the offset margins 21 of the disc or ring-like annular stampings 20. Open-ended slots 27 in the offset margins, radially aligned with slots 26, receive the margin of the main body of the vane which extends beyond the sides of the rectangular section 24.

The vane 22 has an extruded or integrally formed core ring section 29, and an annular groove 30 which limits flexibility and assists in guiding the fluid. The core ring section 29 is effective to assist in establishing a toroidal circuit in the fluid. Thus the vane is provided an unsupported flat region 31 between the peripheries of the discs and the groove 30 in the vane which permits a certain amount of flexing to occur in the vanes 22.

The vane support shown is less expensive than other types of supports, since it is comprised entirely of stampings. The diameter of the disc or ring-like stampings 20 may be chosen to expose a greater or lesser amount of flat region 31 to give any degree of flexibility desired in the vanes. The part of the disc 20 extending into the hydraulic circuit may serve as a baffle to prevent the formation of shallow high velocity vortex circuits during high slip periods. It will be noted that the circuit-defining ring section 29 does not extend to the adjacent vane. This permits each vane to flex individually and independently of its adjacent vanes. By making the wall of the core ring section smaller than the distance between vanes, a slotted core ring construction is secured which increases the efficiency of the coupling under certain conditions.

The driving vanes 42 may be exact duplicates of driven vanes 22 and may be held on an annular member 33 corresponding to the hub member 16. The hub member comprises an inwardly turned flanged ring 45, preferably right angular cross-section, the radial flange of which is secured to housing 13 so as to be rotatable therewith. Said ring is provided with slots 46 at the inner end thereof which receive splines 47 formed in the ends of duplicate disc or ring-like stampings 48 having offset outer regions 49. The substantially rectangular section 50 of vane 42 is received between the offset outer regions 49 and has tabs 51 which fit into slots 52 in the discs or rings 48. Additional slots 53 are provided at the periphery of the disc or rings to receive the margin of the main body of vane 42 which extends beyond the sides of rectangular section 50. The discs or rings 48 may be retained in slots 46 by means of welds 55. An unsupported flat region 54 between the peripheries of the discs and the groove 44 in the vane permits a certain amount of flexing to occur in the vanes 42.

The bolts 34 which secure flanged ring 45 to housing section 13 also secure a plain annulus 35 thereon which serves as an abutment for a bellows type seal 36 inserted between annulus 35 and hub 16.

The construction herein described possesses a number of advantages which improve both the efficiency and the operating characteristics of the coupling. By making both the driving and driven vanes entirely free of the housing in the working circuit, and permitting the vanes to flex outside the working circuit, a vibration dampening effect is secured. This effect is available when the coupling is installed in a motor vehicle and the car is coasting against the engine as well as when the engine is driving. The elimination of shells for the vanes increases the diameter of the permissible hydraulic working circuit without increasing the outside diameter of the housing. This results in a greater capacity for a given-sized coupling. The elimination of the driven vane shell practically eliminates axial thrust on the driven hub and simplifies the bearing construction. Furthermore, the absence of a shell eliminates the problem of returning to the circuit fluid, which had escaped to the outside of the shell, into the reservoir commonly used for this purpose.

As seen in Fig. 3, the radially outward regions of the vane mounting rings or discs 20 and 48 which lie between the slots 27 and 53, may be turned inward toward each other as indicated at 20a and 48a in Fig. 3, thereby to reduce the baffle action.

While this invention has been described in detail in its present preferred form or embodiment, it will be apparent to persons skilled in the art, after understanding the improvements, that various changes and modifications may be made therein without departing from the spirit or scope thereof. It is aimed in the appended claims to cover all such changes and modifications.

I claim:

1. A hydraulic torque transmitting device comprising a rotatable vaned element; a housing for said element; said element comprising a hub member and a plurality of flexible vanes extending therefrom, said vanes having a flexible portion outside the working circuit of the fluid; and individually curved elements integral with said vanes, said curved elements collectively forming a core ring.

2. A hydraulic torque transmitting device as defined in claim 1, said vanes being comprised entirely of flexible material and having a curved stiffening rib which conforms to the working circuit.

3. A hydraulic torque transmitting device comprising a rotatable vaned element; and a housing for said element; said element comprising a hub member and a plurality of flexible vanes extending therefrom; each said vane being comprised entirely of flexible material and having a curved stiffening rib which conforms to the working circuit, said vanes being flexible in the vicinity of said ribs, and said ribs presenting concave surfaces to said vanes.

4. A hydraulic torque transmitting device as defined in claim 3 wherein the vanes have individually curved elements integral therewith, said curved elements collectively forming a core ring.

5. In a hydraulic torque transmitting device a rotary element having a plurality of vanes associated therewith, a portion of each of said vanes being movable relatively to one another and having a portion of a core ring extruded therefrom, the farthest edge of the ring portion being spaced from the adjacent vane to permit such relative movement between vanes.

6. A hydraulic torque transmitting device comprising a driving housing; a driving hub secured to said housing; and radially extending vanes secured to said hub at the radially inner portion of each vane, said vanes being free to move relative to one another and to the housing over substantially their entire working length, said vanes having individually curved elements integral with them and collectively forming a core ring.

7. In a hydraulic torque transmitting device a rotary element having a plurality of vanes drivingly associated therewith, said vanes each having an extension by which they are secured to the element, a portion in the working hydraulic circuit, and an intermediate flexible portion outside the working circuit, the portion in the circuit having a stiffening groove formed therein which follows the working circuit.

8. A hydraulic torque transmitting device as defined in claim 7 wherein the vanes have a portion of a core ring extruded therefrom the farthest edge of said ring portion being spaced from the adjacent ring to permit relative movement between vanes.

9. In a hydraulic torque transmitting device, a rotary element having a plurality of vanes drivingly associated therewith; an axially extending flange on the rotary element; a hub member for supporting the vanes, said hub member comprising spaced slotted washers drivingly connected to the flange, and said vanes having extensions received between the washers and cooperating with the slots to form a driving connection between the vanes and rotary element.

10. A hydraulic torque transmitting device as defined in claim 9 wherein the vane extensions are of rectangular contour and have tabs received in the slots in the washers.

11. A hydraulic torque transmitting device as defined in claim 9 wherein the flange on the rotary element is provided with recesses and the washers have lugs secured in said recesses.

12. A hydraulic torque transmitting device comprising a rotatable vaned element; and a housing for said element; said element comprising a hub member; a disc-shaped mounting member secured to said hub, said member having offset outer regions; and a plurality of flexible vanes extending from said mounting member, said vanes having reduced inner portions positioned between the offset regions of said mounting member and secured thereto, said vanes having a flexible portion outside the working circuit of the fluid.

13. A hydraulic torque transmitting device as defined in claim 12 wherein the offset regions of the mounting member have a plurality of aligned slots to receive tabs on the reduced portions of the vanes, and the outer margins of the offset regions have recesses embracing the vanes adjacent the reduced inner portions thereof.

REINHOLD C. ZEIDLER.

REFERENCES CITED

The following references are of record in the file of this patent:

UNITED STATES PATENTS

| Number | Name | Date |
|---|---|---|
| 2,114,567 | Mercur | Apr. 19, 1938 |
| 2,378,353 | Zeidler | June 12, 1945 |